United States Patent [19]

Lesage

[11] Patent Number: 5,178,351
[45] Date of Patent: Jan. 12, 1993

[54] INSULATING SUPPORT BASE FOR A CYLINDRICAL ELECTRIC HOT WATER TANK

[75] Inventor: Claude Lesage, Pointe-Claire, Canada

[73] Assignee: Giant Factories Inc., Montreal, Canada

[21] Appl. No.: 826,603

[22] Filed: Jan. 28, 1992

[51] Int. Cl.$^5$ .............................................. A47G 23/02
[52] U.S. Cl. .................................... 248/146; 220/636
[58] Field of Search ............. 248/146, 149, 152, 346, 248/174, 172; 220/633, 636, 638; 392/311

[56] References Cited

U.S. PATENT DOCUMENTS

| | | | |
|---|---|---|---|
| 182,658 | 9/1876 | Greiner | 220/636 |
| 1,548,410 | 8/1925 | Derbyshire | 248/172 |
| 2,925,192 | 2/1960 | Herrman | 220/636 |
| 3,137,786 | 6/1964 | Wells | 220/638 X |
| 3,471,114 | 10/1969 | Ball | 248/346 |
| 3,538,866 | 11/1970 | Gaines | 248/146 X |

FOREIGN PATENT DOCUMENTS 503910 7/1930 Fed. Rep. of Germany ...... 220/636
921130 11/1960 United Kingdom ................ 220/636

*Primary Examiner*—J. Franklin Foss

[57] ABSTRACT

An insulating support base for a cylindrical electric water heater tank. The base is formed of a rigid molded foam material and defines a flat circular base having a concentrically disposed support dome on a top face thereof and shaped for close fit within a bottom cavity of a hot water tank for support engagement with a dome shaped bottom wall of an inner casing of the tank. The support dome also guides the inner casing to permit it to be automatically centered on the support base. A spacer ledge is defined about the support dome and extends to an outer edge of the flat circular base. The spacer ledge accommodates an insulating jacket positioned about the tank inner casing with the outer edge of the circular base being disposed in close fit within a lower marginal edge portion of an outer cylindrical casing of the tank to position the outer casing equidistantly spaced about the inner casing with the insulating jacket therebetween.

5 Claims, 2 Drawing Sheets

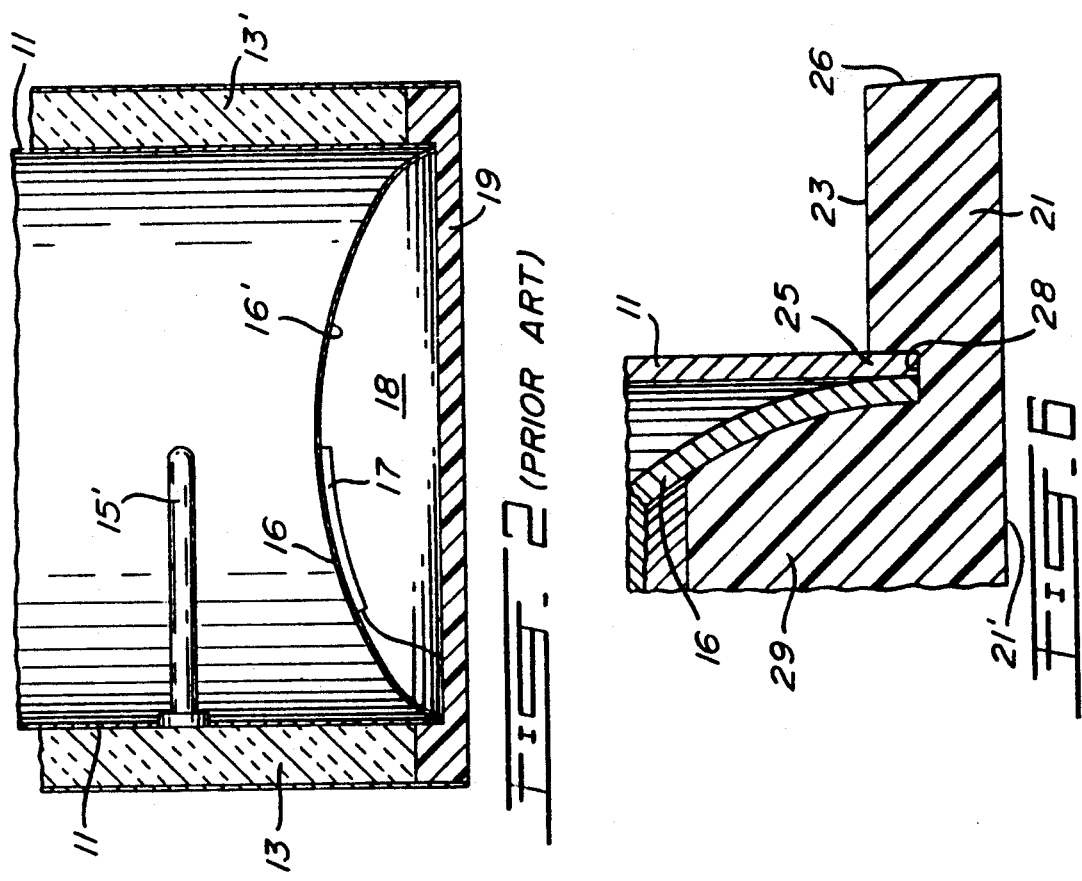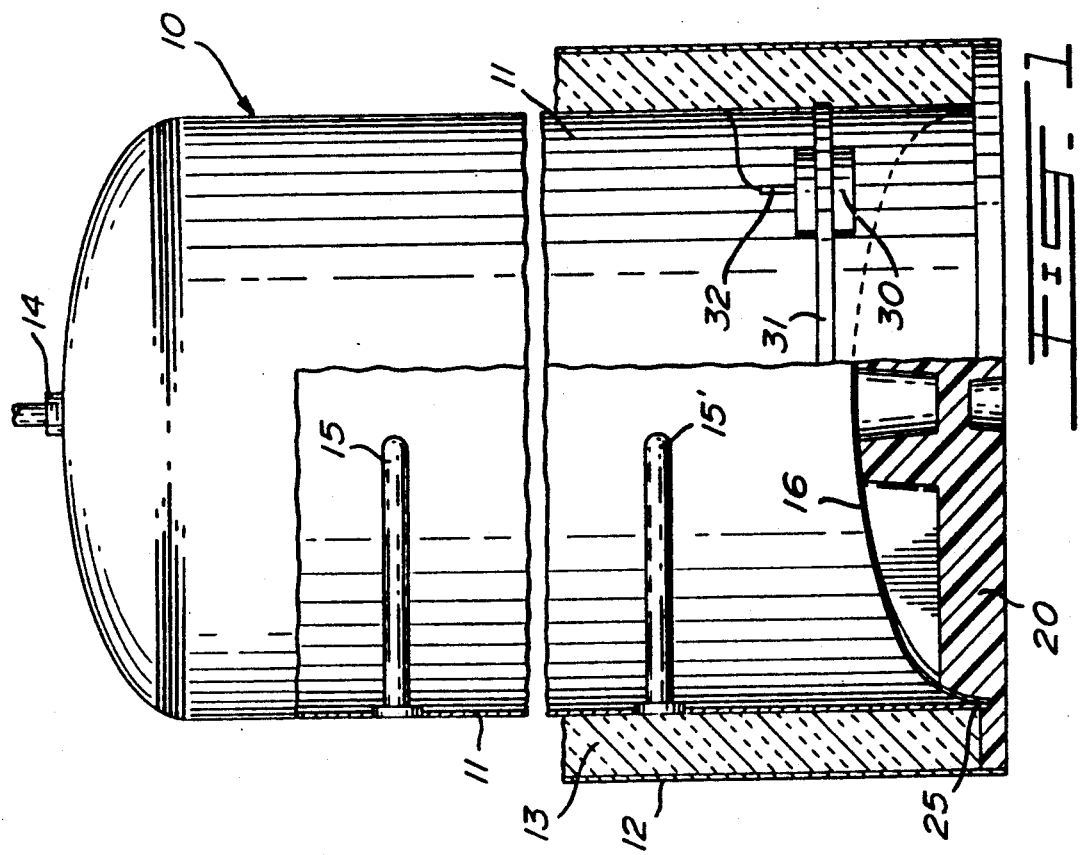

INSULATING SUPPORT BASE FOR A CYLINDRICAL ELECTRIC HOT WATER TANK

BACKGROUND OF INVENTION

1. Field of Invention

The present invention relates to an insulating support base for a cylindrical electric hot water tank.

2. Description of Prior Art

Hot water tanks are constructed with dome shaped bottom walls to withstand the load pressure within the tanks. These hot water tanks contain one, two or three electrodes which are spaced apart along the length of the tank. The bottom electrode is usually positioned about six inches above this dome shaped bottom wall and warms the water in that area to about 130° F. However, the water at the bottom of the tank about the dome shaped bottom wall can fluctuate usually between 90°-100° F. as the water rises to the top of the tank. At these lower temperatures in the bottom of the tank, it has been found that bacteria growth can take place, and in fact the growth of bacteria legionella, and which is harmful to humans, has been attributed to this heat problem in the bottom of the tanks.

In order to resolve the above problem it is known in the prior art to provide an additional heating element on the dome shaped bottom wall to raise the temperature of the water within the tank at the bottom region thereof. However, because the bottom wall is exposed to air in the cavity adjacent its outer surface, the provision of that heating element has not been found efficient, as it also heats air and the metal of the tank as well as the water. The result is that the tank consumes much more electricity and the solution is costly.

Another cause of large temperature differentials within hot water heating tanks is the efficiency of the insulation between the inner and outer casings of the tank. Inproper insulation has results in excessive heat loss in certain regions of the tank. Proper insulation is particularly important in the lower regions of the tank to maintain the water temperature as high as possible to prevent bacterial growth.

SUMMARY OF INVENTION

It is therefore a feature of the present invention to provide an insulating support base for a cylindrical electric water heater tank and which substantially reduces the above-mentioned disadvantages of the prior art.

A further feature of the present invention is to provide an insulating support base for a cylindrical electric water heater tank which permits the inner casing and the outer casing to be perfectly concentrically positioned equidistantly from one another whereby an even layer of insulation may be disposed between the inner and outer casings and wherein the insulation is not damaged or modified by the misalignment of the casings. This feature is needed in the robotic advanced assembly production line.

Another feature of the present invention is to provide an insulating support for a cylindrical electric water heater tank and wherein a plate-like electrode is trapped to the lower region of the inner casing adjacent the dome wall, with the dome wall being insulated by the support base to maintain the temperature in the lower region inside the inner tank and about the dome wall, above that of bacteria growth, to prevent formation of bacteria legionella.

According to the above features, from a broad aspect, the present invention provides an insulating support base for a cylindrical electric water heater tank. The base is formed of a rigid molded foam material and defines a flat circular base having a concentrically disposed support dome on a top face thereof and shaped for close fit within a bottom cavity of a hot water tank for support engagement with a dome shaped bottom wall of an inner casing of the tank. The support dome also guides the inner casing to permit it to be automatically centered on the support base. A spacer ledge is defined about the support dome and extends to an outer edge of the flat circular base. The spacer ledge accommodates an insulating jacket positioned about the tank inner casing with the outer edge of the circular base being disposed in close fit within a lower marginal edge portion of an outer cylindrical casing of the tank to position the outer casing equidistantly spaced about the inner casing with the insulating jacket therebetween.

BRIEF DESCRIPTION OF DRAWINGS

A preferred embodiment of the present invention is described with reference to the accompanying drawings in which:

FIG. 1 is a fragmented view of a cylindrical electric water tank incorporating the insulating support base of the present invention;

FIG. 2 is a section view of the bottom section of a cylindrical electric water heater of the prior art;

FIG. 6 is an enlarged fragmented section view illustrating the position of the locating channel disposed in the top face of the spacer ledge and about the support dome.

DESCRIPTION OF PREFERRED EMBODIMENTS

Figure 3:
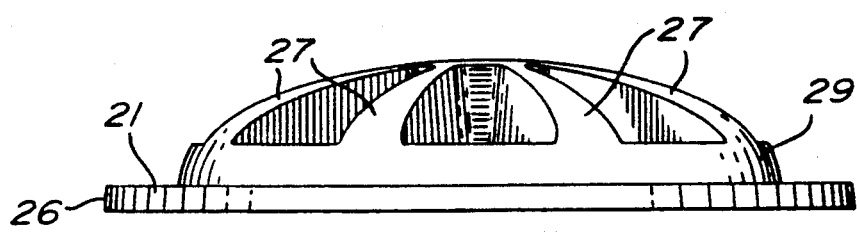
FIG. 3 is a side side view of the insulating support base of the present invention.

Referring now to the drawings and more particularly to FIG. 1, there is shown schematically at 10 a cylindrical electric hot water tank. The tank is constructed of an inner metal tank casing 11 and an outer metal tank casing 12 positioned thereabout with a thermal insulating jacket 13 disposed therebetween. The tank is provided with fittings 14 to admit water in an out of the tank in order to maintain a constant supply of water therewithin. Two or more resistive heating elements 15 are disposed at various levels within the tank. As herein shown, the lower electrode 15' is disposed approximately six inches above the dome shaped bottom wall 16 of the inner casing. The bottom wall is dome shaped to withstand the load in the tank.

FIG. 2 shows a tank bottom section as formed in the prior art. As herein shown, a further resistive heating element 17 is secured to the outer face 16' of the dome shaped bottom wall 16 to heat the water in the lower section of the tank to raise the temperature of the water to prevent the formation of bacteria legionella. As previously described, the position of the electrode 17 on the outer face of the done shaped bottom wall 16 results in a substantial heat loss within the space 18 under the dome wall with some of the heat being lost through the metal base 19 of the tank. Also, it has been found difficult with the prior art to perfectly position the outer tank casing 12 concentrically about the inner tank casing 11 on the base 19. Consequently, the insulating jacket 13 may be damaged or compressed in certain portions of the tank and form spaces 13' in other portions resulting in uneven insulation and consequently heat loss. These problematic factors have made it difficult to resolve the problem of maintaining the temperature in the lower portion of the tank sufficiently high to prevent bacteria growth and in an economically efficient manner.

Figure 4:
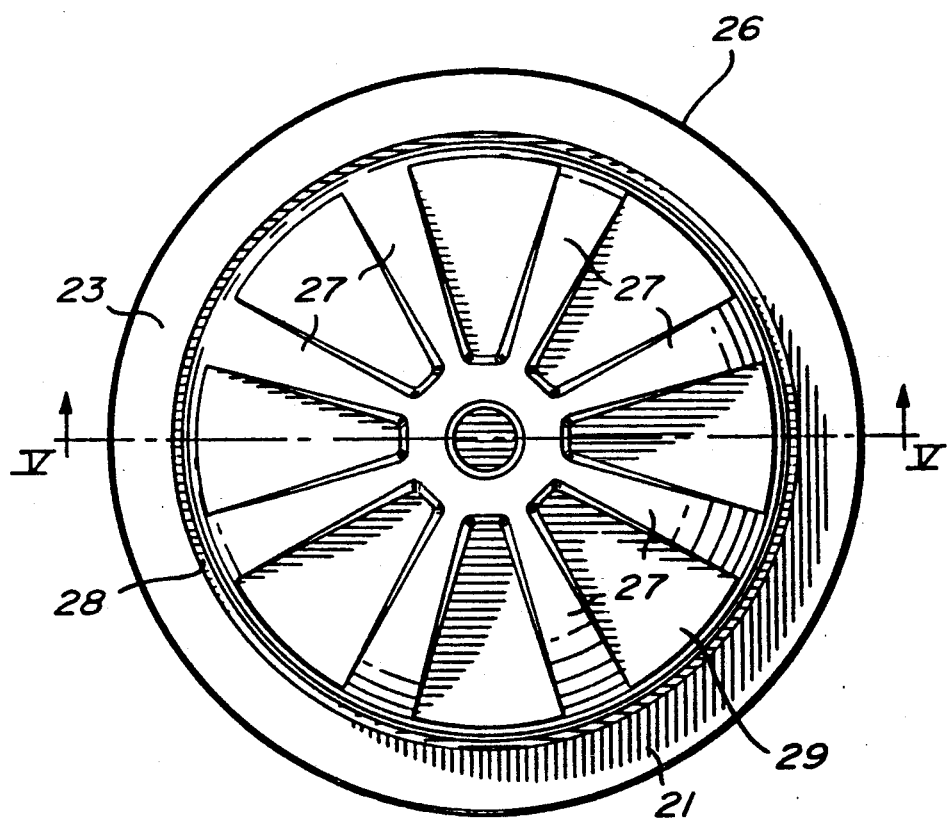
FIG. 4 is a top view of FIG. 3.
Figure 5:
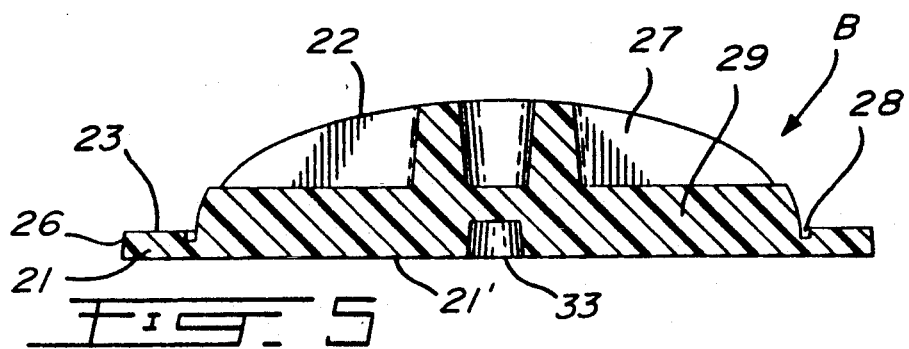
FIG. 5 is a section view through section lines V—V of FIG. 4.

Referring now additionally to FIGS. 4 to 6, there will be described the construction and function of the insulating support base 20 of the present invention. As herein shown the support base 20 is formed of a rigid molded foam material, such as polystyrene foam which is a good thermal insulation. The base defines a flat circular base portion 21 having a concentrically disposed support dome 22 integrally molded on a top face 23 of the base portion 21. This support dome 22 is shaped for close fit within the bottom cavity 18 of the inner casing 11 so that the support dome provides support engagement with the dome shaped bottom wall 16 to provide distributed support of the load within the tank and distribute it across the flat bottom surface 21' of the base 20. The support dome 22 also has a cylindrical inwardly shaped side edge 24 to guide the inner casing 11 to permit it to be automatically centered on the support base 20 by guiding the lower flange edge 25 of the inner tank casing 11 into a circumferential locating channel 28 disposed in the top face 23 of a spacer ledge 24 of the flat wall 21. Pilot hole 33 is the guide on the automatic production line.

The spacer ledge 24 extends to an outer edge 26 of the flat circular base 21. This outer edge 26 may have a slight inner inclination of about 5° to facilitate the placement of the outer tank casing 12 about the base. The spacer ledge 24 is dimensioned to accommodate the insulating jacket 13 position about the tank inner casing with the outer casing being maintained spaced substantially equidistantly about the inner casing not to damage the insulating jacket by accidental shifting of the inner and outer casings during assembly.

As more clearly seen in FIGS. 3 to 5, the support dome 22 is herein defined by a plurality of equidistantly spaced radiating support ribs 27 formed integrally with the support base 21. The ribs have a curved convex shape and a curved top face to fit flush with the outer face 16' of the dome shaped bottom wall of the inner tank casing, and to transmit the load inside the tank on the flat bottom surface 21' of the circular base 21.

As shown in FIG. 6, the lower flange edge 25 of the inner casing 11 is snugly received within the circumferential channel 28 and provides a seal therewith. The insulating support base also has a thick bottom wall section 29 which provides good insulation to substantially reduce heat loss from the bottom dome shaped wall 16 of the tank. Accordingly, the support base provides both load support, good thermal insulation of the dome shaped bottom wall to increase heat retention within the lower inner section of the inner casing of the hot water tank, and furthermore is adapted to an automated assembly line by pilot 33.

Additionally and as shown in FIG. 1, the lower section of the tank is further heated by a resistive heating plate 30 formed of pliable material and shaped to the curve of the inner casing outer wall and secured thereto by a detachable strap attachment 31. A thermostat 32 is positioned between the resistive heating plate 30 and the outer wall of the inner casing 11 to regulate the temperature of the resistive heating plate, and to assure that the water temperature at the bottom of the inner casing is at a temperature sufficiently high to prevent harmful bacteria growth.

It is within the ambit of the present invention to cover any obvious modifications of the preferred embodiment described herein, provided such modifications fall within the scope of the appended claims.

I claim:

1. An insulating support base for supporting a cylindrical electric water heater tank, said base being formed of rigid molded foam material and defining a circular base having a flat bottom wall with a concentrically disposed support dome on a top face thereof and shaped for close fit within a bottom cavity of said tank for support engagement with a dome shaped bottom wall of a casing of said tank, said support dome having an angulated outer side wall for guiding a lower flange edge of said inner casing to permit same to be automatically centered on said support base in sealing engagement therewith, a spacer ledge defined about said support dome and extending to an outer edge of said flat circular base, said spacer ledge accommodating an insulating jacket positioned about said tank inner casing with said outer edge of said flat circular base being disposed in close fit within a lower marginal edge portion of an outer cylindrical casing of said tank to position said outer casing equidistantly spaced about said inner casing with said insulating jacket therebetween.

2. A support base as claimed in claim 1 wherein said support dome is defined by a plurality of equidistantly spaced radiating support ribs formed integrally with said support base, said tank bottom cavity having a resistive heating plate secured on an outer face of said bottom cavity and disposed between said ribs of said support dome and below a lower inner resistive heating element of said tank to heat water at the bottom area of said tank to a temperature sufficient to prevent the growth of bacteria legionella, said support base insulating said dome shaped bottom wall to substantially reduce heat loss in said bottom area of said tank.

3. A support base as claimed in claim 1 wherein a circumferential locating channel is disposed in a top face of said spacer ledge and positioned immediately about said support dome to receive said lower flange edge of said inner casing in sealing engagement.

4. A support as claimed in claim 3 wherein said ribs have a curved convex shape and a top face shaped for flush contact with said outer face of said bottom cavity of said tank to support said tank and distribute the load of the tank over said flat bottom wall of said support base.

5. A support base as claimed in claim 4 wherein said rigid molded foam material is a polystyrene thermal insulating foam material.

* * * * *